Oct. 23, 1928.
G. A. BAKER
1,688,775
EYE SHIELD
Filed Sept. 22, 1926
2 Sheets-Sheet 1
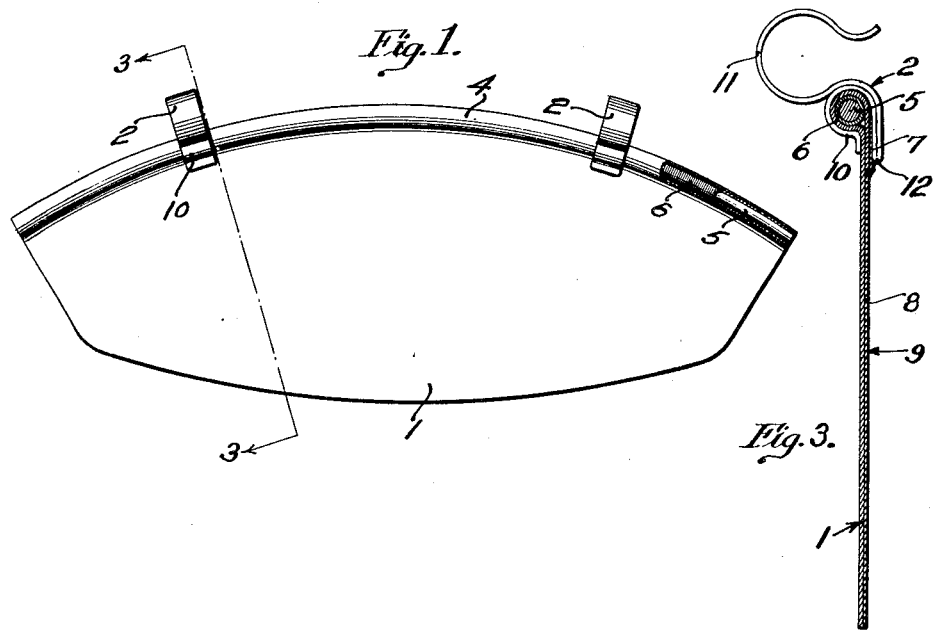
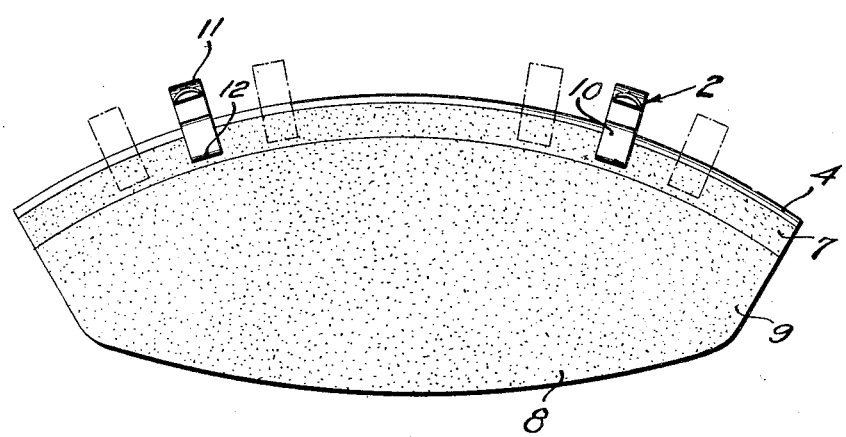
WITNESSES
Evelyn Crompton
George A. Gruss
INVENTOR
George A. Baker
BY
Joshua R. H. Potts
ATTORNEY Oct. 23, 1928.

G. A. BAKER 1,688,775

EYE SHIELD

Filed Sept. 22, 1926    2 Sheets-Sheet 2

WITNESSES
Evelyn Crompton
George A. Gruss

INVENTOR
George A. Baker
BY
Joshua R. H. Potts
ATTORNEY

Patented Oct. 23, 1928.

1,688,775

UNITED STATES PATENT OFFICE.

GEORGE A. BAKER, OF PHILADELPHIA, PENNSYLVANIA.

EYE SHIELD.

Application filed September 22, 1926. Serial No. 137,108.

Figure 4:
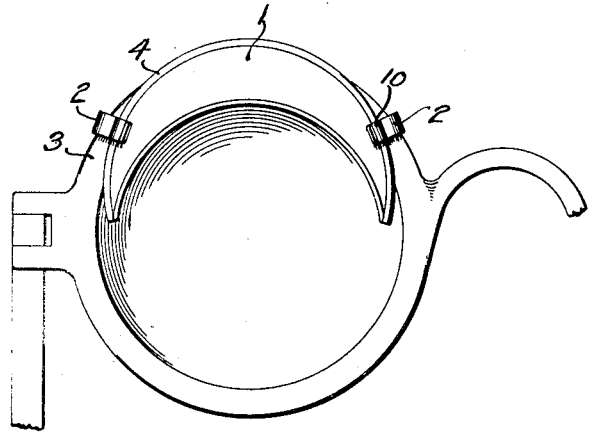
Figure 5:
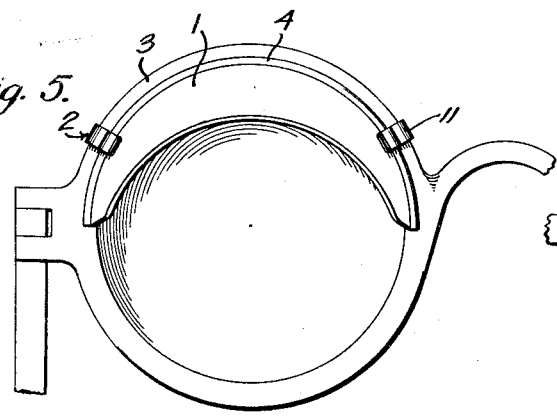
Figure 6:
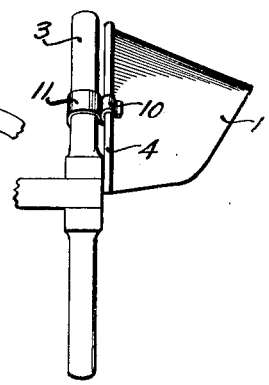

My invention relates to eye shields adapted for use on spectacles and its objects are to provide an eye shield which may be readily bent into shape and adjusted to fit any style and size of spectacles; which may be quickly attached to the spectacles, either above or at the side of the lens, and which may be readily manufactured at a comparatively low cost and used for advertising purposes.
These objects, and other advantageous ends which will be described hereinafter, I attain in the following manner, reference being had to the accompanying drawings in which Figure 1 is a plan view of an eye shield made in accordance with my invention, Figure 2 an inverted plan view of the shield shown in Figure 1, Figure 3 an enlarged section taken on line 3—3 of Figure 1, Figure 4 a fragmentary front view of spectacles showing one step in applying the shield thereto above the lens, Figure 5 a like view showing the second step, Figure 6 a side view of the spectacles and the shield shown in Figure 5, and Figure 7 a side view of the spectacles showing the shield attached at the side of the lens.

Referring to the drawings, 1 indicates a guard, 2 clips adjustably fastened to the edge of the guard and adapted to be attached to the rim 3 of the spectacles.
The guard is made from flexible material, such as cloth, and is preferably cut into the shape shown. A bead 4 on one edge of the guard is formed by hemming the edge which is covered with adhesive, over a covered wire 5 so that the hemmed edge adheres to the wire covering 6 and to the inner side of the guard at 7. The wire cover 6 prevents the adhesive from coming in contact with the wire and causing it to stick to the guard, thus allowing the wire to bend freely and remain in position when bent with the guard to the proper shape to fit the spectacles. A lining 8, glued to the inner side of the guard has a dull black surface 9 for absorbing the light striking the inner side of the guard. This inner side of the guard is adjacent the eye when attached on the spectacles.

The guard may be readily attached to spectacles of any size or shape, either above or at the side of the lens as shown in Figures 4–7. The clips 2 may be of any suitable shape which have a part 10 slidably fitting over the beaded edge 4 and a resilient loop 11 which fits over and clamps the rim 3 of the spectacles. As shown, each clip is bent from a single piece over the beaded edge to form the part 10 and then folded upon itself at 12 and bent partway over the part 10 into the shape of loop 11.

In applying the shield to the spectacles above the lens, the guard is first bent to a greater curvature than the curvature of the rim of the spectacles. The clips are then placed over the rim as shown in Figure 4 and slid slightly along the rim until the guard takes the curvature coinciding with the rim as shown in Figure 5.

Figure 7:
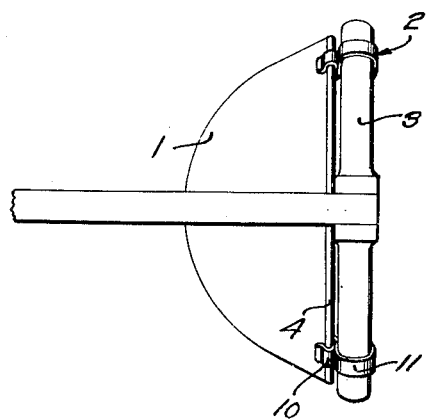

In applying the shield to the spectacles at the side of the lens as shown in Figure 7, the spectacles are preferably removed from the eyes and the clips slipped over the rim. The guard is then adjusted to fit comfortably against the face when the spectacles are put on for use.

The shield, when above the lens, prevents glaring light rays from passing to the eye and absorbs reflected stray rays striking the inner side of the shield and thus prevents such rays from passing through the lens to the eye. The shield when used at the side of the lens prevents dust and wind from passing to the eye and causing discomfort to the wearer and probably injury to the eye.

The shield may be used with various sizes and styles of glasses by simply bending it to the shape of the rim and adjusting the clips to the proper position for attaching the shield to the rim. The outer face of the guard may be colored or printed in any suitable manner for ornamenting or advertising purposes. Owing to its simple construction and its low cost of manufacture, the shield may be printed and distributed free of cost for advertising purposes and, due to its pliable nature, it may be straightened after use and put away in a small case which may be readily carried in the pocket.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what

I claim as new and desire to secure by Letters Patent is:—

1. An eye shield, bendable to fit the rim of an eye glass and capable of being flattened when not in use, including a pliable guard having its under surface opaque and capable of absorbing light rays, a soft wire secured along one edge of the guard to form a bead, and clips slidable on the bead for engaging the rim of the eye glass.

2. An eye shield comprising a soft wire, a covering on the wire, a pliable guard having one of its edges folded over the wire and cemented to the covering thereof to form a bead, an opaque lining in the guard capable of absorbing rays of light, and spring clips slidable on the bead and having resilient loops for engaging the rim of an eye glass.

In testimony whereof I have signed my name to this specification.

GEORGE A. BAKER